United States Patent
Hiraya et al.

(10) Patent No.: US 7,334,547 B2
(45) Date of Patent: Feb. 26, 2008

(54) VARIABLE EXPANSION-RATIO ENGINE

(75) Inventors: Koji Hiraya, Yokohama (JP); Ryosuke Hiyoshi, Yokosuka (JP); Daisuke Tanaka, Yokosuka (JP); Hirofumi Tsuchida, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/716,886

(22) Filed: Mar. 12, 2007

(65) Prior Publication Data

US 2007/0209630 A1 Sep. 13, 2007

(30) Foreign Application Priority Data

Mar. 13, 2006 (JP) ............... 2006-067855
Dec. 6, 2006 (JP) ............... 2006-329864

(51) Int. Cl.
*F02B 75/04* (2006.01)
*F01L 1/34* (2006.01)

(52) U.S. Cl. ............... 123/48 R; 123/48 B; 123/78 R; 123/78 F; 123/90.15

(58) Field of Classification Search .... 123/48 R–48 D, 123/78 R–78 F, 90.15
See application file for complete search history.

(56) References Cited

U.S. PATENT DOCUMENTS

2004/0065293 A1* 4/2004 Goto .............. 123/27 GE

FOREIGN PATENT DOCUMENTS

| EP | 1363002 | 11/2003 |
|---|---|---|
| EP | 1541814 | 6/2005 |
| EP | 1674692 | 6/2006 |
| GB | 746800 | 3/1956 |
| GB | 2267310 | 12/1993 |
| WO | WO-2006/023098 | 3/2006 |

OTHER PUBLICATIONS

Copy of European Search Report for EP 07103901.
English Abstract for GB-746800.

\* cited by examiner

*Primary Examiner*—Noah P. Kamen
(74) *Attorney, Agent, or Firm*—Global IP Counselors, LLP

(57) ABSTRACT

A variable expansion-ratio engine includes an expansion-ratio adjuster configured to adjust an expansion ratio; a load detector configured to detect an engine load; and a controller configured to control the expansion-ratio adjuster. The controller controls the expansion ratio such that the expansion ratio at the time when the load is below a predetermined load value is set lower than that at the time when the load is equal to the predetermined load value.

14 Claims, 15 Drawing Sheets

MAXIMUM ROCKING STATE

MINIMUM ROCKING STATE

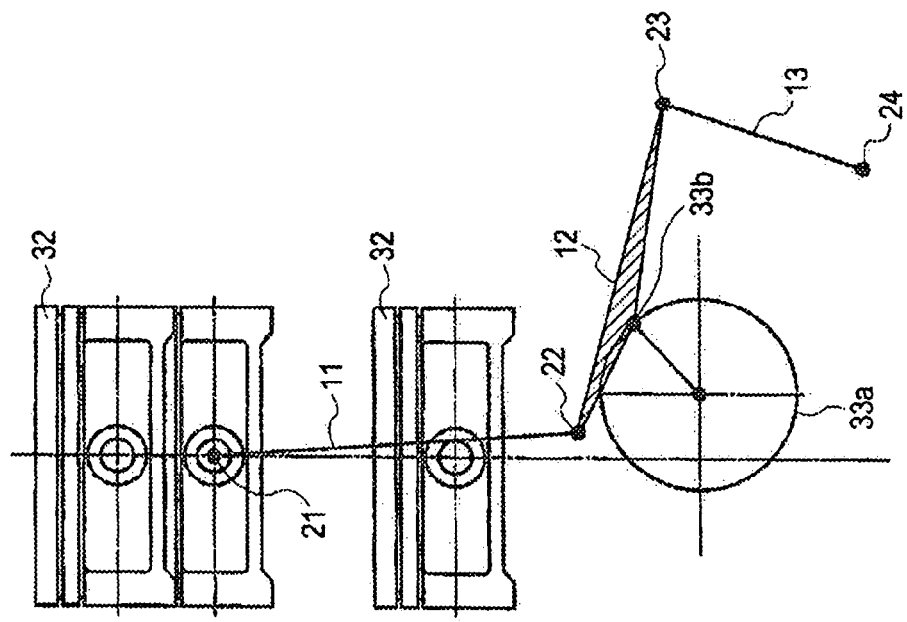
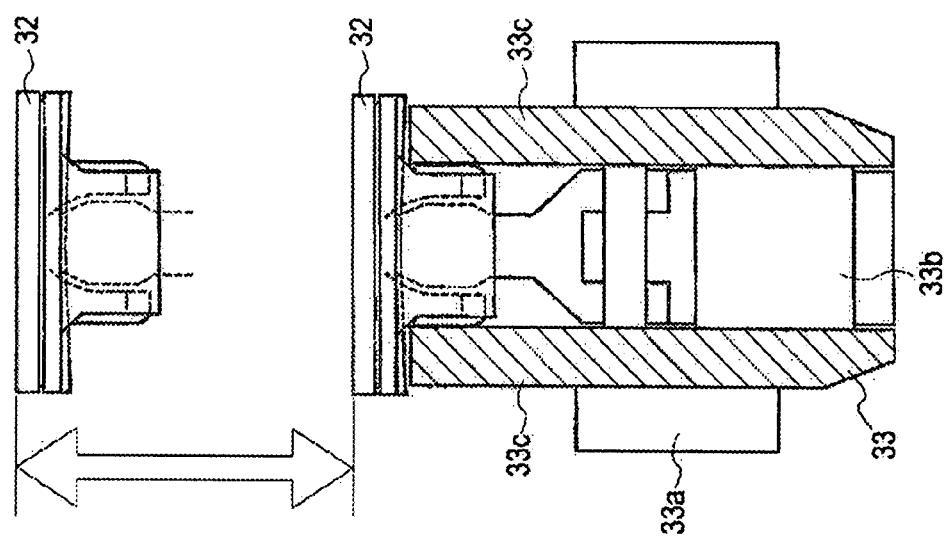
FIG. 17A
FIG. 17B

VARIABLE EXPANSION-RATIO ENGINE

CROSS-REFERENCES TO RELATED APPLICATION

This application claims priority from Japanese Patent Application Serial Nos. 2006-067855 filed Mar. 13, 2006 and 2006-329864 filed Dec. 6, 2006, the entire contents of which are incorporated herein by reference.

TECHNICAL FIELD

A variable expansion-ratio engine is discussed, and more particularly, an expansion-ratio control operation in the variable expansion-ratio engine.

BACKGROUND

An example of a typical variable compression-ratio (expansion-ratio) engine, is disclosed in Japanese Unexamined Patent Application Publication No. 2000-073804, the contents of which are incorporated herein in their entirety.

In the variable compression-ratio engine discussed in Japanese Unexamined Patent Application Publication No. 2000-073804, each rocking lever that supports a corresponding piston is linked to a crankshaft by means of a first connecting rod, such that the rocking lever revolves around a crankpin of the crankshaft. The piston reciprocates back and forth within a corresponding cylinder, and the reciprocation of the piston is converted to a rotary motion of the crankshaft via the rocking lever and the first connecting rod. The crankshaft and associated members collectively represent a revolving mechanism.

A motor separate from the engine selectively rotates an eccentric shaft, and due to the eccentricity of the eccentric shaft, the rocking lever connected to the eccentric shaft by means of a second connecting rod revolves around the crankpin of the crankshaft. The revolution of the rocking lever changes the relative position between the top dead center of the piston and the cylinder, thereby changing the compression ratio of the internal combustion engine.

The engine is equipped with a common sensor for the cylinders or a plurality of sensors provided individually for each cylinder. The common sensor or each of the sensors is configured to detect knocking or predictive knocking. Furthermore, the engine is also equipped with a controlling mechanism configured to drive the revolving mechanism while simultaneously changing the compression ratio of the cylinders. If the sensor detects knocking or predictive knocking of any one of the cylinders, the controlling mechanism simultaneously lowers the compression ratio of the cylinders.

For an example of an engine that controls opening and closing timings of intake and exhaust valves, the contents of Japanese Unexamined Patent Application Publication No. 8-177429 is incorporated herein in its entirety.

The engine of this example has a communication hole in a tubular sleeve, and a working-fluid supply/exhaust passageway that communicates with the communication hole. Moreover, the engine also has a duct arrangement, which is provided in a tappet and communicates with the communication hole. The tappet has a hydraulic chamber therein and extends slidably through the sleeve.

When the sleeve and the tappet are relatively displaced from each other, the duct arrangement and the communication hole are blocked off from each other. Then, a piston extending slidably through the hydraulic chamber is driven together with the tappet, thereby opening or closing the valves. In other words, until the communication between the duct arrangement and the communication hole is blocked off, the piston is not driven since the oil in the hydraulic chamber can enter or leave the chamber. Consequently, the engine is equipped with a driving mechanism for driving the sleeve and a controlling mechanism for controlling the driving mechanism. The controlling mechanism can be the same as or different from the controlling mechanism discussed above. Based on information received from an operating-condition detecting mechanism, the controlling mechanism drives the sleeve by a predetermined amount through the driving mechanism so as to control the distance (i.e., time) required to block off the communication between the duct arrangement and the communication hole. In this manner, the valve timing changes.

When it is determined that the variable compression-ratio engine is in operation within a low revolution range, or in a startup period, or in a cold startup period, the valve timing of the intake valve or the exhaust valve is adjusted to a retarded opening timing and advanced closing timing (i.e., a smaller operating angle). On the other hand, if it is determined that the variable compression-ratio engine is in operation within a high revolution range, the valve timing of the intake valve or the exhaust valve is adjusted to an advanced opening timing and retarded closing timing (i.e., a larger operating angle).

In an engine in which the compression ratio (expansion ratio) is adjustable, the compression ratio of the engine is generally set at maximum for a low-load operating range to reduce fuel consumption. However, the present inventors have found that if the expansion ratio is too high when the load is equal to or below a predetermined low load value, the pressure in the cylinder becomes lower than the atmospheric pressure just before the exhaust valve opens in the latter half of an expansion process. In other words, the engine does negative work, leading to high fuel consumption. This is especially prominent in a case where the compression ratio becomes substantially lower than the expansion ratio, which is caused when the valve timing of the intake valve is set to a retarded opening timing and advanced closing timing such that the closing timing of the intake valve is significantly advanced from the bottom dead center point.

A variable compression-ratio engine such as that disclosed in Japanese Unexamined Patent Application Publication No. 2000-073804, and incorporated herein in its entirety is intended to avoid the occurrence of knocking by reducing the compression ratio when knocking occurs in a high-load operating range. On the other hand, the engine applies a high compression ratio (expansion ratio) for a low-load operating range in order to improve the fuel consumption.

On the other hand, in an engine such as that disclosed in Japanese Unexamined Patent Application Publication No. 8-177429, and incorporated herein in its entirety, which controls the opening and closing timings of the intake and exhaust valves, the control of the opening timing of the exhaust valve is intended for increasing the gas exchange efficiency for the high revolution range (i.e., absorb a large amount of new gas by reducing as much residual gas as possible). However, Japanese Unexamined Patent Application Publication No. 8-177429 has no description with regard to a control operation for improving the fuel consumption under low load.

BRIEF SUMMARY OF THE INVENTION

Accordingly, it is one of the advantages of the present invention to provide a variable expansion-ratio engine that prevents high fuel consumption in a predetermined low load range. The present invention provides a variable expansion-ratio engine, which includes an expansion-ratio adjuster configured to adjust an expansion ratio; a load detector configured to detect an engine load; and a controller configured to control the expansion-ratio adjuster. The controller controls the expansion ratio such that the expansion ratio at the time when the load is below a predetermined load value is set lower than that at the time when the load is equal to the predetermined load value.

According to the present invention, the occurrence of negative work is prevented when the load is below a predetermined load value, thereby preventing high fuel consumption.

BRIEF DESCRIPTION OF DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIGS. 17A and 17B illustrate the piston behavior;

DETAILED DESCRIPTION

Figure 1:
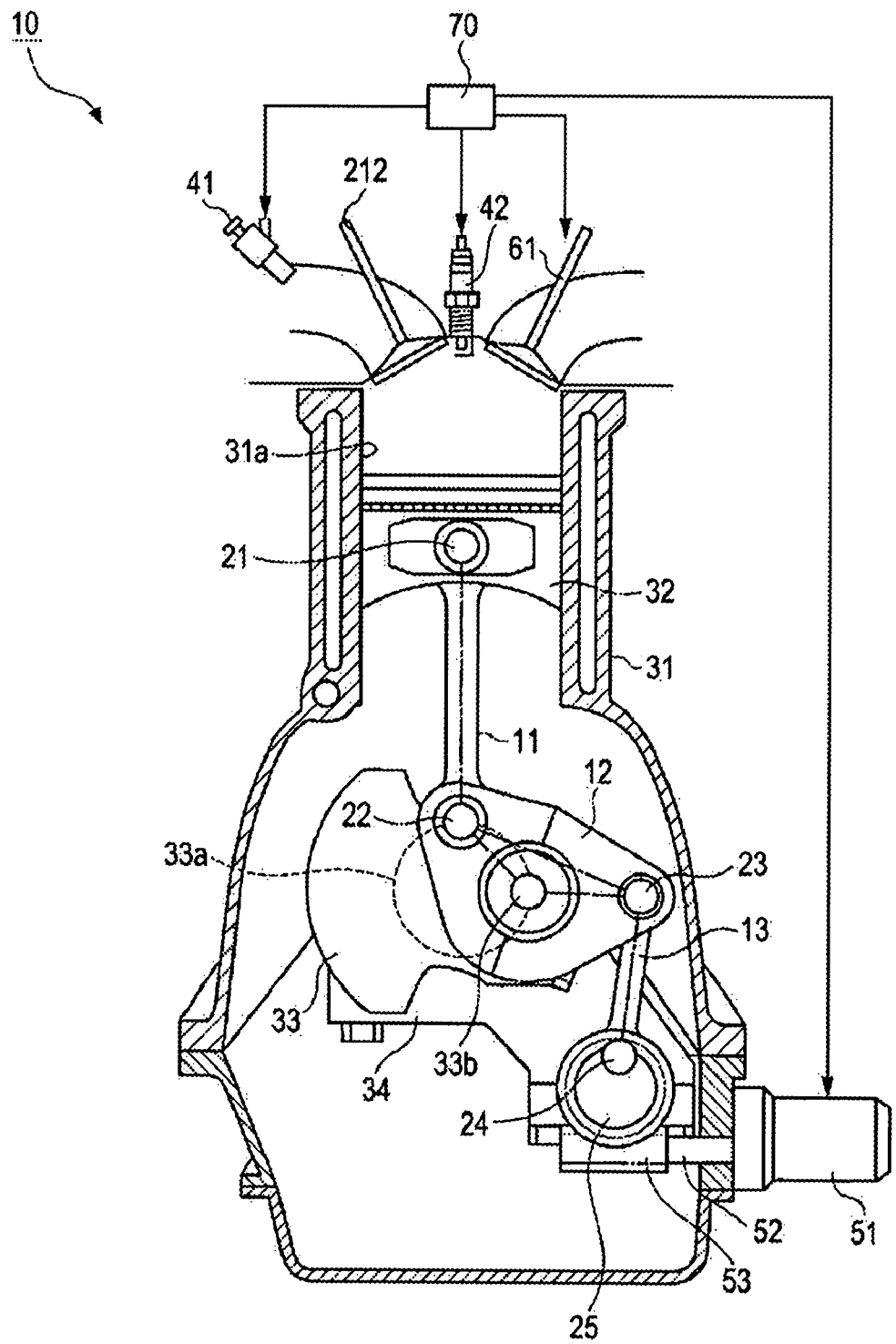
FIG. 1 illustrates a multilink-type variable expansion-ratio engine according to a first exemplary embodiment.

FIG. 1 illustrates a variable expansion-ratio engine 10 according to a first exemplary embodiment. The variable expansion-ratio engine 10 includes a multilink mechanism constituted by two links, which are used for linking a piston 32 to a crankshaft 33. This type of variable expansion-ratio engine will be referred to as a multilink-type variable expansion-ratio engine hereinafter. On the other hand, in a typical engine, the piston and the crankshaft are linked to each other by means of a single link (connecting rod), and the expansion ratio of the engine is fixed. In comparison to such a typical engine, the piston in the multilink-type variable expansion-ratio engine stays near the top dead center for a longer period of time (e.g., see Japanese Unexamined Patent Application Publication No. 2002-285857, which is incorporated herein by reference in its entirety).

First, the multilink-type variable expansion-ratio engine according will be described. The multilink-type variable expansion-ratio engine 10 includes a piston 32 and a crankshaft 33, which are linked to each other by means of a multilink mechanism constituted by two links 11, 12. The link 11 is an upper link (first link) that is connected to the piston 32, whereas the link 12 is a lower link (second link) that is connected to the upper link 11 and to the crankshaft 33. The multilink-type variable expansion-ratio engine 10 also includes a control link 13 used for controlling the links 11 and 12 to change the expansion ratio of the multilink-type variable expansion-ratio engine 10.

The upper link 11 has an upper end that is connected to the piston 32 by means of a piston pin 21 and a lower end that is connected to a first end of the lower link 12 by means of a connecting pin 22. In response to combustion pressure, the piston 32 reciprocates back and forth within a cylinder 31a of a cylinder block 31. The lower link 12 has its first end connected to the upper link 11 by means of the connecting pin 22 and its second end connected to the control link 13 by means of a connecting pin 23. Moreover, the lower link 12 has a connecting hole in substantially the center thereof, such that the connecting hole is positioned between the first and second ends of the lower link 12, respectively, and including the connecting pins 22, 23. A crankpin 33b of the crankshaft 33 extends through this connecting hole, such that the lower link 12 is rotatable around a central axis of the crankpin 33b which is parallel to a rotary axis of the crankshaft 33. The lower link 12 can be split into left and right components. The connecting pins 22, 23 and the crankpin 33*b* extend in the longitudinal direction of the crankshaft 33.

The crankshaft 33 is constituted by a plurality of journals 33*a* and the crankpin 33*b*. The journals 33*a* are rotatably supported by the cylinder block 31 and a rudder frame 34. The central axis of the crankpin 33*b* is offset from the center of each of the journals 33*a* by a predetermined distance, and the crankpin 33*b* is rotatably engaged to the connecting hole in the lower link 12.

The control link 13 has the connecting pin 23 extending through one end thereof such as to be rotatably connected to the second end of the lower link 12. Moreover, the other end of the control link 13 is provided with a control shaft 25, such that the control link 13 is connected to the control shaft 25 by means of a connecting pin 24 that extends parallel to the rotary axis of the crankshaft 33. The control shaft 25 is a rod-shaped member disposed parallel to the rotary axis of the crankshaft 33. This rod-shaped member, defining the control shaft 25, has a rack gear around the outer periphery thereof. The rack gear is meshed with a pinion 53 provided on a rotary shaft 52 of an actuator 51. As the actuator 51 expands and contracts, the control shaft 25 is rotated such as to move the connecting pin 24 in a revolving fashion, thereby rocking the control link 13 about the connecting pin 24. The upper link 11, the lower link 12, and the control link 13 constitute a top-dead-center position adjusting mechanism.

A controller 70 controls the actuator 51 to rotate the control shaft 25 so as to change the expansion ratio of the multilink-type variable expansion-ratio engine 10. A method for changing the expansion ratio will be described later with reference to FIGS. 2A to 2C. The controller 70 also controls the fuel injection of a fuel injection valve 41 provided at an intake port. Moreover, the controller 70 also controls the ignition timing of an ignition plug 42 provided on a cylinder head (not shown). The engine 10 has an exhaust valve 61 whose opening/closing timing is adjustable, which will be described hereinafter. The controller 70 controls the opening/closing timing of the exhaust valve 61 in order to adjust the amount of exhaust gas recirculation (EGR). The controller 70 is defined by a microcomputer equipped with a central processing unit (CPU), a read-only memory (ROM), a random access memory (RAM), and an input/output interface (I/O interface). Alternatively, the controller 70 may be constituted by a plurality of microcomputers.

Even if the expansion ratio is made adjustable in the multilink-type variable expansion-ratio engine 10, the engine is favorably prevented from being increased in size. Moreover, the engine 10 also allows the top-dead-center position of the piston 32 to be changed readily. In addition, the stroke characteristics of the piston 32 are substantially a simple harmonic motion so that the engine vibration can be reduced. Accordingly, an engine with reduced noise and vibration is achieved. Such a simple harmonic motion is superior to that in a typical engine in which a piston and a crankshaft are linked to each other by means of a single connecting rod.

Figure 2:
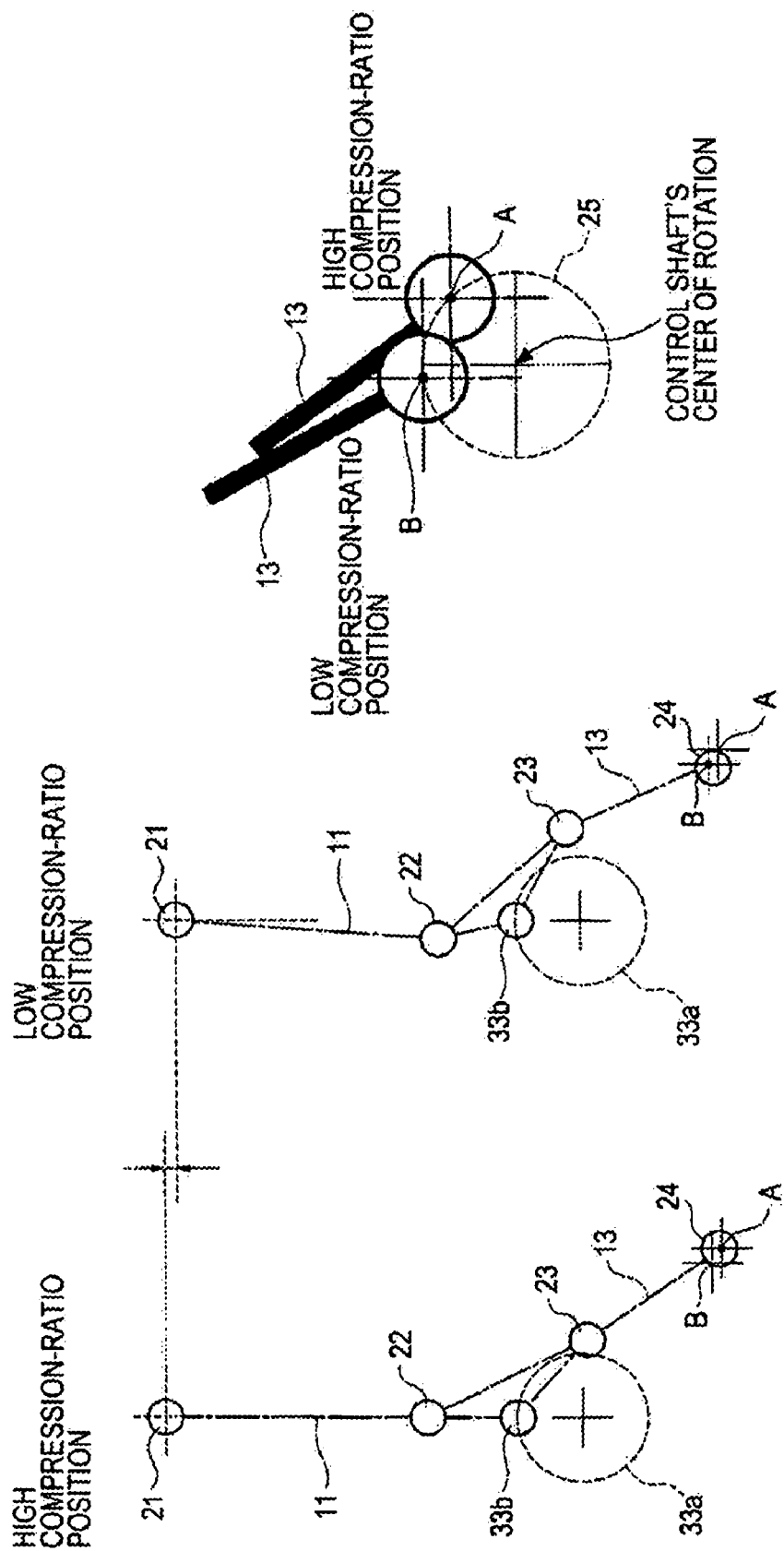
FIGS. 2A to 2C illustrate a method for changing an expansion ratio in the multilink-type variable expansion-ratio engine.

FIGS. 2A to 2C illustrate a method for changing the expansion ratio in the multilink-type variable expansion-ratio engine 10.

When the control shaft 25 controlled by the controller 70 is rotated by a predetermined amount, the position of the connecting pin 24 changes, whereby the expansion ratio of the multilink-type variable expansion-ratio engine 10 is changed to a predetermined value. For example, referring to FIGS. 2A and 2C, when the connecting pin 24 set at position A, the crankpin 33*b* is positioned at an angle corresponding to the top dead center of the piston 32 and the upper link 11 thus extends in the vertical direction. In this state, the piston 32 at its top dead center is at the highest position. In other words, the top dead center position is the highest position for the piston 32, which is where the expansion ratio is high.

On the other hand, referring to FIGS. 2B and 2C, when the connecting pin 24 is rotated counterclockwise from position A to position B, the control link 13 is pushed upward, whereby the position of the connecting pin 23 becomes higher. Consequently, the lower link 12 rotates counterclockwise around the crankpin 33*b* so that the connecting pin 22 is lowered in the lower left direction. This lowers the position of the piston 32 at the top dead center, whereby the expansion ratio becomes lower.

Accordingly, by controlling the position of the connecting pin 24 in the control shaft 25 to control the position of the piston 32, the controller 70 can variably control the compression ratio (expansion ratio) of the multilink-type variable expansion-ratio engine 10.

Figure 3:
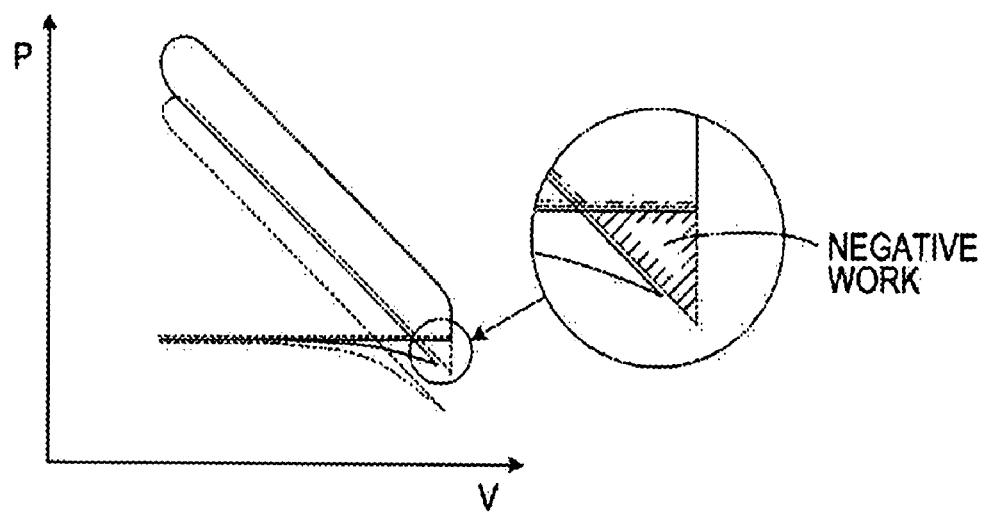
FIG. 3 is a P-V line diagram illustrating an Otto cycle for describing the occurrence of negative work.

FIG. 3 is a pressure-volume (P-V) line diagram illustrating an Otto cycle in the multilink-type variable expansion-ratio engine 10. In FIG. 3, a solid line corresponds to a case where a load is equal to or above a predetermined load value, a dotted line corresponds to a case where the variable expansion-ratio control according to this embodiment is not implemented when a load is below the predetermined load value, and a dot-dash line corresponds to a case where the variable expansion-ratio control according to this embodiment is implemented when a load is below the predetermined load value.

As shown with the dotted line, when the engine 10 is in operation while the load is below the predetermined load value, the load is controlled by regulating the air intake by an amount more than that in the case where the load is equal to or above the predetermined load value. Under a condition in which the amount of mixed gas within the cylinder 31*a* is low and the pressure in the cylinder does not increase by a great degree, the pressure in the cylinder becomes a negative value since the exhaust valve 61 is closed in the latter half of an expansion process. In other words, the engine 10 does negative work, as indicated by a shaded section in FIG. 3. The predetermined load value corresponds to a condition under which a negative pressure is generated in the latter half of an expansion process. When the engine 10 is in operation while the load is equal to or above the predetermined load value, such negative work does not occur, as shown with the solid line. It is considered that a predetermined load range in which negative work occurs is generated only under a high compression ratio (expansion ratio). Consequently, the relationship between the load and an expansion ratio that causes negative work is preliminarily determined from experimental results.

In order to prevent the efficiency (fuel consumption) from being lowered due to negative work, the variable expansion-ratio control as illustrated in FIGS. 2A to 2C is implemented in this embodiment so as to substantially lower the expansion ratio to reduce the occurrence of negative work. In FIG. 3, the dot-dash line corresponds to a case where the variable expansion-ratio control is implemented. Specifically, by lowering the expansion ratio, a negative pressure is not generated, thereby preventing the occurrence of negative work.

Figure 4:
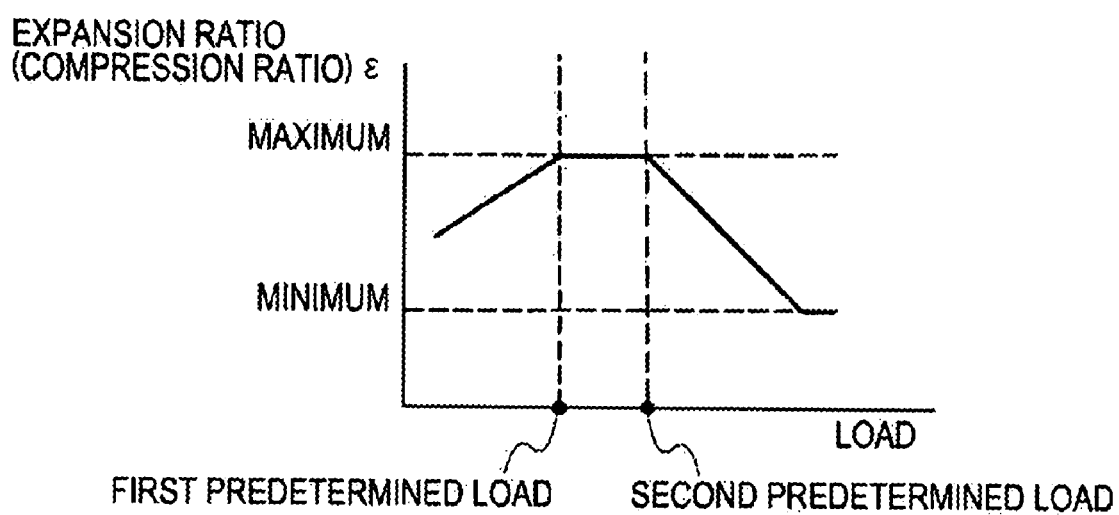
FIG. 4 shows the relationship between the load and the expansion ratio (compression ratio) in the multilink-type variable expansion-ratio engine.

FIG. 4 shows the relationship between the expansion ratio (compression ratio) and the load in a case where the multilink-type variable expansion-ratio engine 10 is used.

FIG. 4 shows that when the load is below a first predetermined load value at which negative work occurs, the variable expansion-ratio control is implemented such that the expansion ratio becomes lower in comparison to an expansion ratio at the time when the load is equal to the first predetermined load value. More specifically, the expansion ratio is variably controlled such that the expansion ratio (compression ratio) becomes lower as the load decreases. On the other hand, in a range between the first predetermined load value and a second predetermined load value, the compression ratio of the multilink-type variable expansion-ratio engine 10 is set at a maximum to improve the efficiency. When the load is equal to or above the second predetermined load value, the compression ratio is set to decrease gradually as the load increases in order to prevent the occurrence of knocking.

Figure 5:
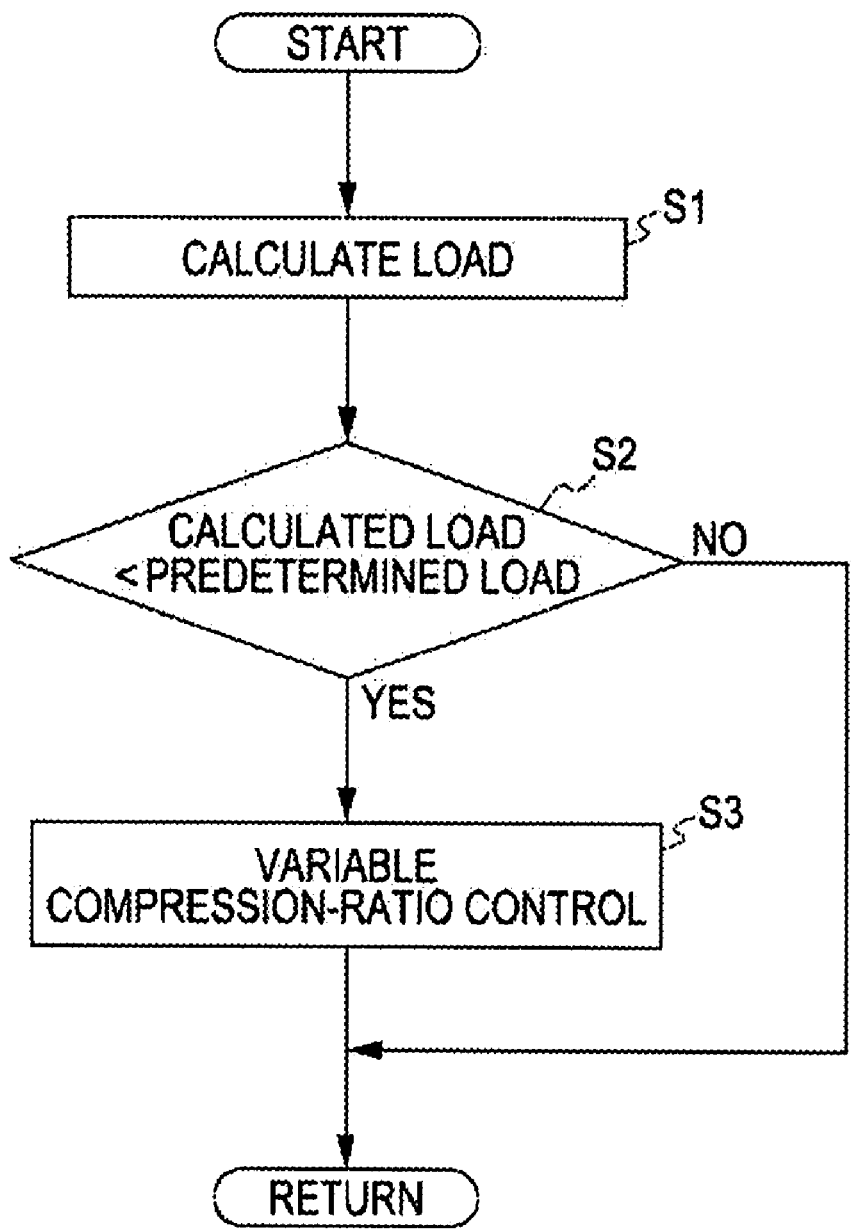
FIG. 5 is a flow chart illustrating a variable expansion-ratio control operation.

FIG. 5 is a flow chart illustrating the variable expansion-ratio control performed by the controller 70 in the multilink-type variable expansion-ratio engine 10.

In step S1, a load is calculated based on a detection signal of an airflow meter. In step S2, the calculated load is compared with a predetermined load value determined on the basis of negative work. If the calculated load is below the predetermined load value, the operation proceeds to step S3 since there is a possibility that negative work may occur in the latter half of an expansion process. Then, the expansion ratio of the multilink-type variable expansion-ratio engine 10 is lowered in accordance with the characteristics shown in FIG. 4, and the operation ends. On the other hand, if the calculated load is equal to or above the predetermined load value in step S2, the operation ends.

Accordingly, in the latter half of an expansion process in the multilink-type variable expansion-ratio engine 10 of this embodiment, when the load is below a predetermined load value at which negative pressure is generated within the cylinder 31a, the expansion ratio is made lower than that at the time when the load is equal to or above the predetermined load value. Lowering the expansion ratio reduces the occurrence of negative pressure and thus contributes to improved fuel consumption.

Figure 6:
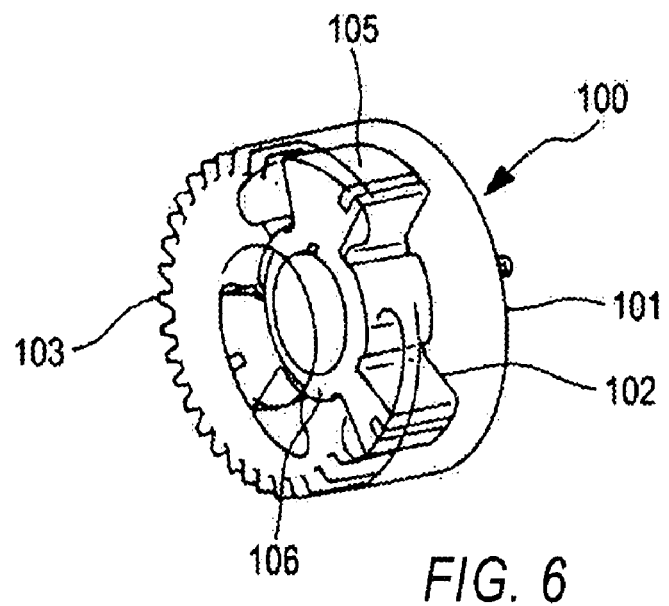
FIG. 6 is a perspective view showing an example of a valve-timing controlling device for an exhaust valve provided in a multilink-type variable expansion-ratio engine according to a second exemplary embodiment.
Figure 7:
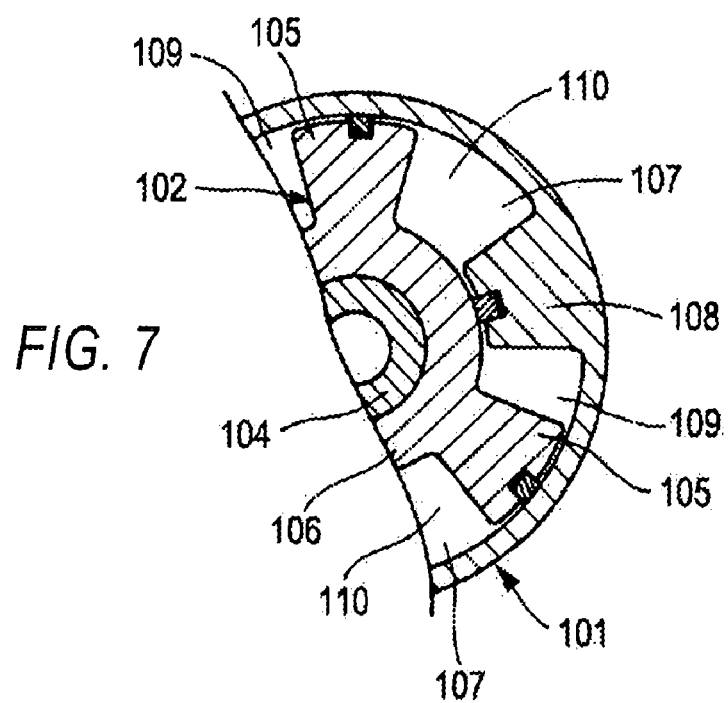
FIG. 7 is a partial cross-sectional view of the valve-timing controlling device for the exhaust valve.

FIG. 6 is a perspective view showing an example of a valve-timing controlling device 100 provided in a multilink-type variable expansion-ratio engine 10 according to a second exemplary embodiment. FIG. 7 is a cross-sectional view showing a relevant portion of the valve-timing controlling device 100.

As a valve-timing controlling device 100, the device disclosed in Japanese Unexamined Patent Application Publication No. 2003-49616, and incorporated by reference in its entirety, may be used. For example, the valve-timing controlling device 100 may be provided on a camshaft disposed at the exhaust side. The valve-timing controlling device may be used to control the opening/closing timing of the exhaust valve 61 by means of the controller 70. A valve-timing controlling device 100 will be described below in detail by reference to FIGS. 6 and 7.

The valve-timing controlling device or adjuster (exhaust valve opening-timing adjusting means) 100 includes a cylindrical housing 101 serving as a first rotary member, a rotor 102 serving as a second rotary member housed in the housing 101, a hydraulic supply valve (not shown), and the controller 70 (not shown in FIG. 6) that controls the hydraulic supply valve. One end surface of the housing 101 has a cam sprocket wheel 103 fixed thereto. A timing chain (not shown) is wound between the cam sprocket wheel 103 and a crank sprocket wheel of the crankshaft 33 (not shown in FIG. 6). The rotor 102 is relatively rotatable with respect to the housing 101 by a predetermined angle. Moreover, by means of a center bolt 104, the rotor 102 is fixed to an end of a camshaft (not shown) which opens and closes the exhaust valve 61.

Specifically, the housing 101 rotates in synchronization with the crankshaft 33, and the rotor 102 rotates together with the housing 101, thereby driving the camshaft. From this predetermined state in which the camshaft is driven, the housing 101 and the rotor 102 rotate relatively respect to each other so as to advance or retard the phase of the camshaft with respect to the crankshaft 33. The housing 101 and the rotor 102 are disposed coaxially with respect to the center of rotation of the camshaft.

The rotor 102 includes a plurality of vanes 105 that extend radially from the center of rotation of the rotor 102. For example, three vanes 105 are provided in the rotor 102. In detail, the rotor 102 has an annular portion 106 extending along the inner periphery thereof, and the three vanes 105 extending from this annular portion 106 towards the housing 101 at a substantially fixed angular interval (120° in FIGS. 6 and 7).

On the other hand, the housing 101 has three projections 108 arranged on the inner surface thereof at a substantially fixed angular interval (120° in FIG. 7). Each of the projections 108 is projected towards the annular portion 106 of the rotor 102 and has an end that is in contact with the annular portion 106. Each adjacent pair of projections 108 has a fan-shaped recess 107 therebetween. The vanes 105 of the rotor 102 are disposed within these recesses 107. Since the circumferential length of each recess 107 is greater than the circumferential length of each vane 105, the rotor 102 is relatively rotatable with respect to the housing 101 in the circumferential direction by only a predetermined angle.

Each of the recesses 107 is divided into two chambers by the corresponding vane 105. These two chambers function as pressure chambers, one being an advance hydraulic chamber 109 and the other being a retard hydraulic chamber 110. Accordingly, when the controller 70 controls the supply of oil pressure to the advance hydraulic chamber 109 through a hydraulic control valve, the rotor 102 rotates relatively in a direction for advancing the valve timing of the exhaust valve 61, namely, in the clockwise direction in FIG. 7. On the other hand, when oil pressure is supplied to the retard hydraulic chamber 110, the rotor 102 rotates relatively in a direction for retarding the valve timing of the exhaust valve 61, namely, in the counterclockwise direction in Fig. Since this valve-timing controlling device 100 controls the valve timing of the exhaust valve 61 by adjusting the relative rotational position between the housing 101 and the rotor 102, the opening timing of the exhaust valve 61 is also advanced when the closing timing thereof is advanced. In other words, by correctively advancing the closing timing of the exhaust valve 61, the opening timing thereof is correctively advanced by the same corrected amount.

Accordingly, the controller 70 controls the supply of oil pressure to the hydraulic chambers 109, 110 inside the housing 101 in accordance with the operating conditions of the multilink-type variable expansion-ratio engine 10. This control adjusts the relative rotational position between the housing 101 and the rotor 102, thereby controlling the valve timing of the exhaust valve 61.

Figure 8:
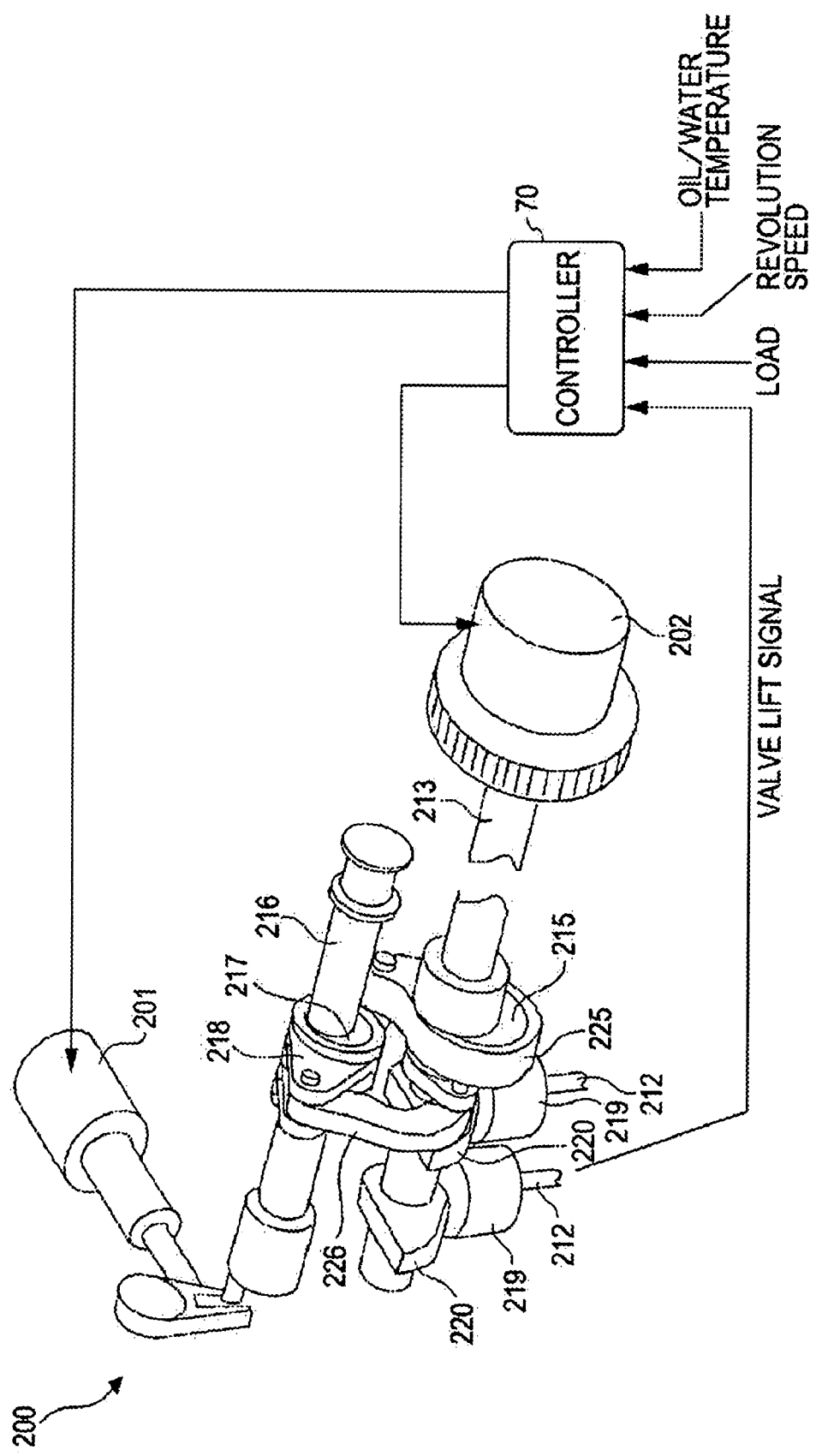
FIG. 8 schematically illustrates another example of a valve-timing controlling device, which is for an intake valve.
Figure 9:
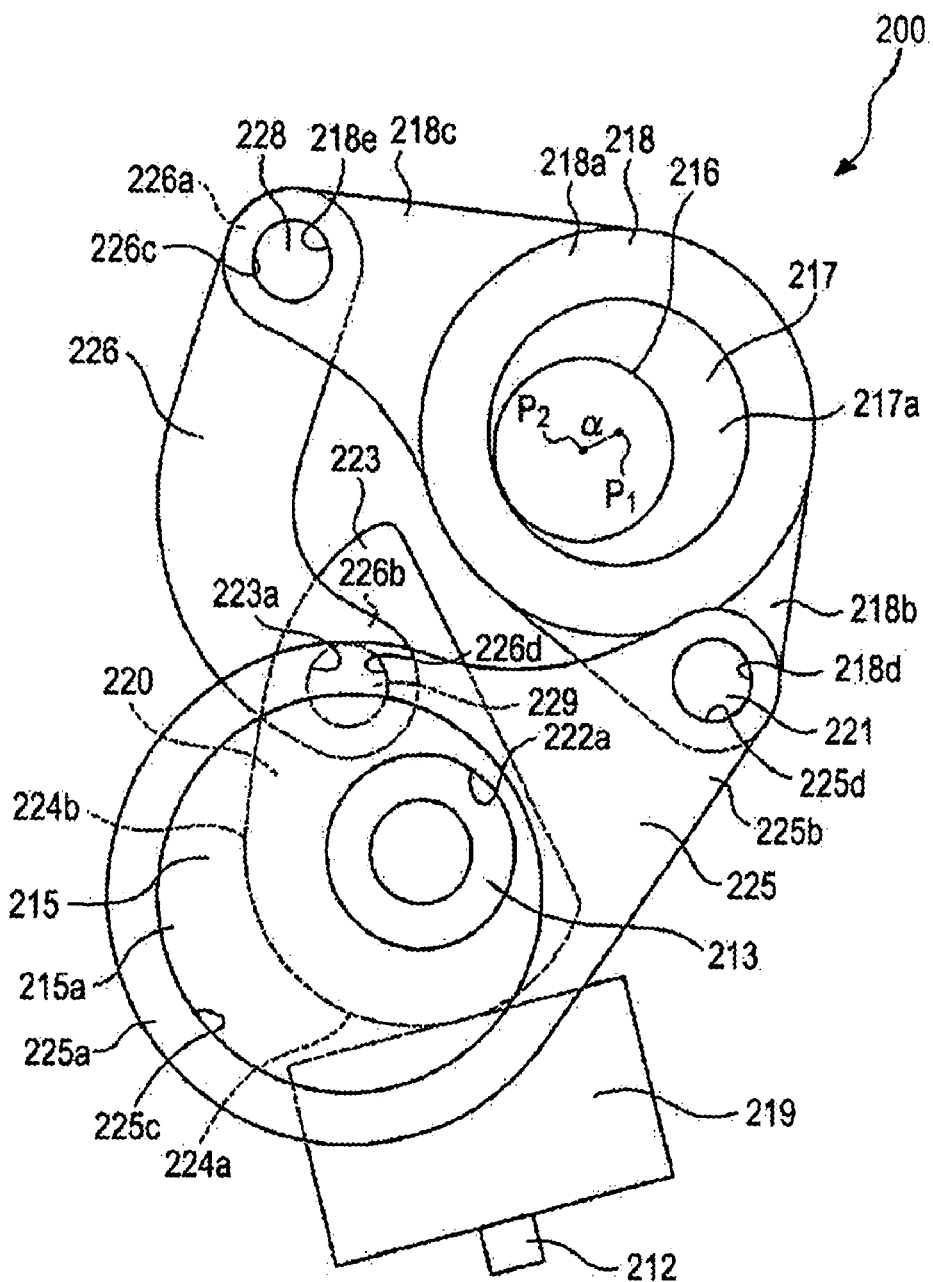
FIG. 9 schematically illustrates the valve-timing controlling device for the intake valve, as viewed in a direction in which a drive shaft extends.

FIG. 8 illustrates another example of a valve-timing controlling device 200. Valve-timing controlling device 200 employs a mechanism disclosed in, for example, Japanese Unexamined Patent Application Publication No. 11-107725, which is incorporated herein in its entirety. With reference to FIGS. 8 and 9, the following description is directed to a case where the valve-timing controlling device 200 is applied to an intake valve 212.

The valve-timing controlling device or adjuster (exhaust valve opening-timing adjusting means) 200 includes a lift-amount controlling actuator 201 for controlling the lift amount of the intake valve 212, a phase-angle controlling actuator 202 for controlling the phase angle of the intake valve 212, and an engine controller 70 for controlling the lift-amount controlling actuator 201 and the phase-angle controlling actuator 202.

The valve-timing controlling device 200 is equipped with the intake valve 212 disposed slidably on the cylinder head, a drive shaft 213 rotatably supported by an upper portion of the cylinder head, a drive cam 215 securely attached to the drive shaft 213, a shaft 216 rotatably supported above the drive shaft 213, a rocker arm 218 rockably supported by the control shaft 216 with a control cam 217 disposed therebetween, and a rocking cam 220 disposed on an upper end of the intake valve 212 with a valve lifter 219 functioning as a transmission member therebetween. Furthermore, the drive cam 215 and the rocker arm 218 are linked to each other by means of a link arm 225, and the rocker arm 218 and the rocking cam 220 are linked to each other by means of a link member 226.

The drive shaft 213 and the control shaft 216 are disposed parallel to a crankshaft (not shown). The drive shaft 213 has a driven sprocket wheel on one end thereof. The driven sprocket wheel transmits torque from the crankshaft 33 of the multilink-type variable expansion-ratio engine 10 to the drive shaft 213, thereby rotating the drive shaft 213.

FIG. 9 illustrates the valve-timing controlling device 200 as viewed in a direction in which the drive shaft 213 extends.

The rocker arm 218 has a base portion 218a in the central section thereof, which is rotatably supported by the control cam 217. A first end portion 218b of the rocker arm 218 extending from one side of the base portion 218a has a pinhole 218d in which a pin 221 is press-fitted. A second end portion 218c of the rocker arm 218 extending from the other side of the base portion 218a also has a pinhole 218e in which a pin 228 is press-fitted. The pin 228 is connected to a first end 226a of the link member 226.

The control cam 217 is cylindrical and is fixed to the outer periphery of the control shaft 216. The center of axle P1 of the control cam 217 is biased from the center of axle P2 of the control shaft 216 by an amount α.

The rocking cam 220 has a support hole 222a through which the drive shaft 213 extends, such that the drive shaft 213 is supported by the support hole 222a in a rotatable fashion. A cam-nose end 223 of the rocking cam 220, which is an end proximate to the second end portion 218c of the rocker arm 218, has a pinhole 223a. Furthermore, the lower side of the rocking cam 220 is defined by a circular base surface 224a and an arc cam surface 224b extending from the circular base surface 224a towards the cam-nose end 223. The circular base surface 224a and the arc cam surface 224b are contactable with the upper surface of the valve lifter 219 at a predetermined position thereof in accordance with the rocking position of the rocking cam 220.

The link arm 225 includes an annular base portion 225a having a relatively large diameter and a protruding end 225b protruding from a specific position on the outer periphery surface of the base portion 225a. The base portion 225a has an engagement hole 225c in the center thereof. The engagement hole 225c is rotatably engaged to an outer periphery surface of a cam body 215a of the drive cam 215. On the other hand, the protruding end 225b has a pinhole 225d through which the pin 221 rotatably extends.

The first and second ends 226a, 226b of the link member 226 have pin insertion holes 226c, 226d, respectively. An end of the pin 228 press-fitted in the pinhole 218e in the second end portion 218c of the rocker arm 218 extends rotatably through the pin insertion hole 226c, and likewise, an end of a pin 229 press-fitted in the pinhole 223a in the cam-nose end 223 of the rocking cam 220 extends rotatably through the pin insertion hole 226d. The link member 226 and the pins 228, 229 press-fitted in the respective pinholes 218e, 223a constitute a link mechanism.

The control shaft 216 is rotated by the lift-amount controlling actuator 201 disposed at one end thereof within a predetermined rotation-angle range. On the other hand, the drive shaft 213 is rotated by the phase-angle controlling actuator 202 disposed at one end thereof within a predetermined rotation-angle range. The lift-amount controlling actuator 201 and the phase-angle controlling actuator 202 are driven based on a control signal from the controller 70, which detects the operating conditions of the engine 10.

The controller 70 calculates the engine speed on the basis of a detection signal from a crank-angle sensor, calculates the load on the basis of a detection signal from an airflow meter, and detects the water temperature on the basis of a detection signal from a water temperature sensor. Based on the current operating conditions of the engine 10 determined from the above calculations and detection, the controller 70 outputs a control signal to the lift-amount controlling actuator 201 and the phase-angle controlling actuator 202.

An operation of the valve-timing controlling device 200 will be described below with reference to FIGS. 10A to 11B.

First, when the lift amount of the intake valve 212 is to be reduced, the lift-amount controlling actuator 201 and the phase-angle controlling actuator 202 are rotated in one direction in response to a control signal from the controller 70. Thus, referring to each of FIGS. 10A and 10B, while the center of axle P1 of the control cam 217 is maintained at the upper right side of the center of axle P2 of the control shaft 216, a thick portion 217a of the control cam 217 moves away from the drive shaft 213 in the upward direction. Consequently, in comparison to each of FIGS. 11A and 11B to be described below, the rocker arm 218 is entirely shifted upward with respect to the drive shaft 213, and the cam-nose end 223 of the rocking cam 220 is forcibly lifted upward by a slight amount through the link member 226, whereby the entire device rotates clockwise.

Figure 10B:
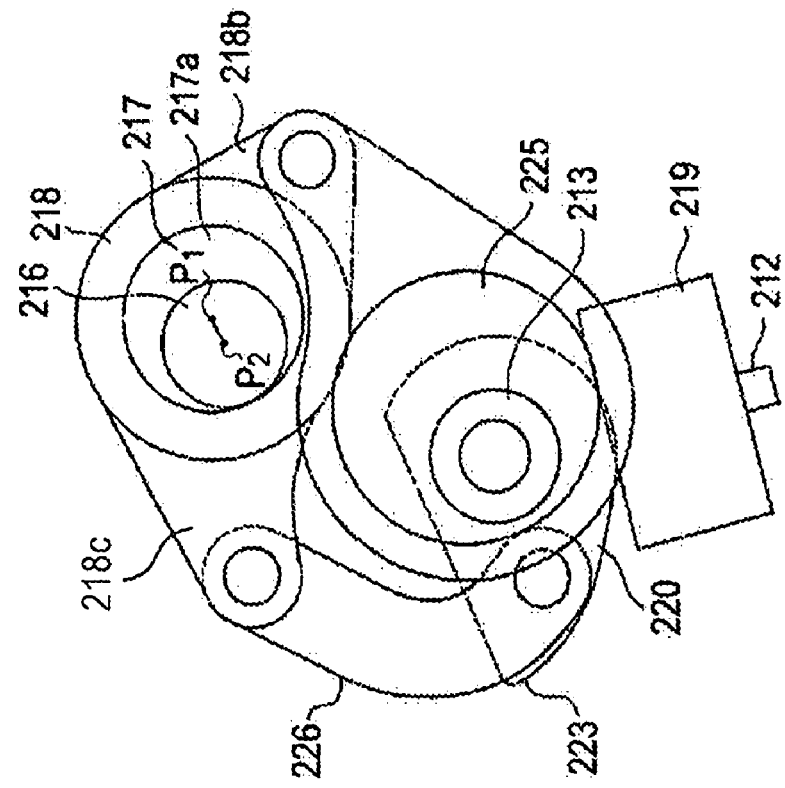
FIGS. 10A and 10B respectively illustrate a minimum rocking state and a maximum rocking state of the valve-timing controlling device when the lift amount for the intake valve is set low.
Figure 10A:
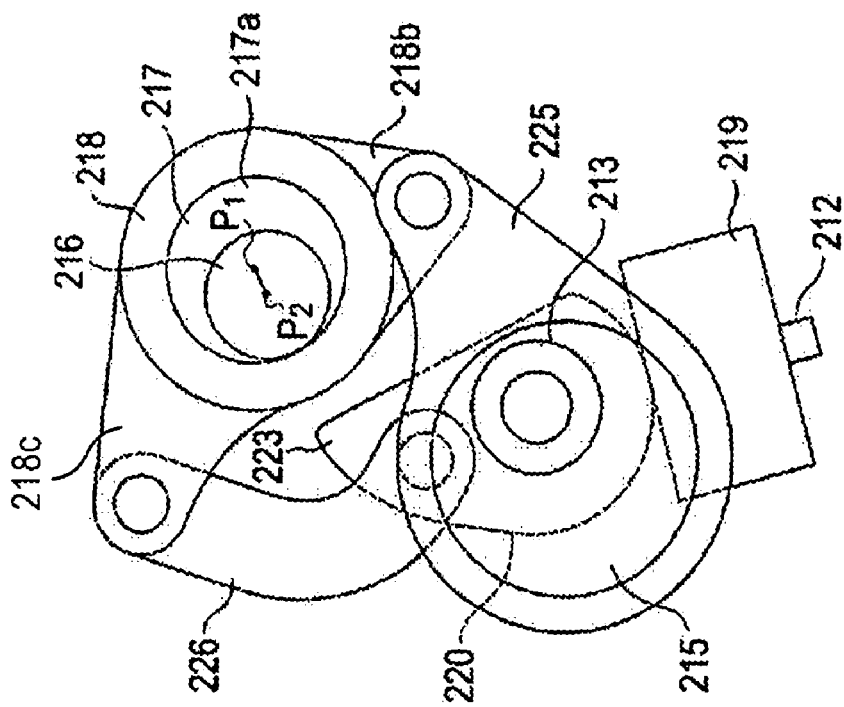

Referring to FIGS. 10A and 10B, when the drive cam 215 rotates to push the first end portion 218b of the rocker arm 218 upward via the link arm 225, the lift amount of the first end portion 218b is transmitted to the rocking cam 220 and the valve lifter 219 through the link member 226. In this case, the lift amount is relatively small, as shown in FIG. 10B.

Figure 12:
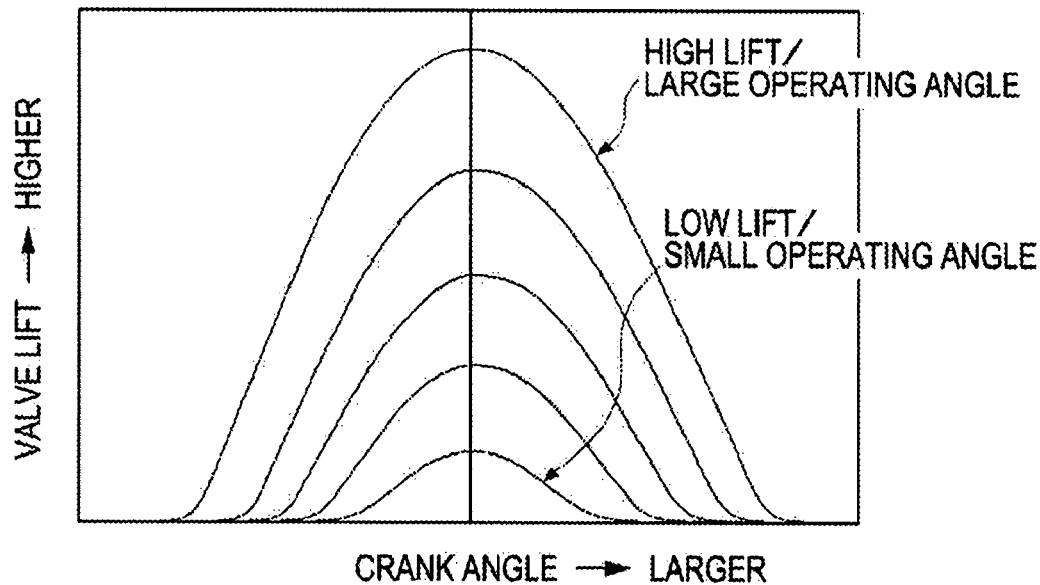
FIG. 12 illustrates the relationship between an operating angle and the lift amount for the intake valve controlled by the valve-timing controlling device.

Accordingly, referring to FIG. 12, as the valve lift amount becomes smaller, the opening timing of the intake valve 212 is retarded, thus resulting in a less valve overlap period between the intake valve 212 and the exhaust valve 61. This contributes to improved fuel consumption and stable revolution of the engine 10.

On the other hand, when the lift amount of the intake valve 212 is to be increased, the lift-amount controlling actuator 201 and the phase-angle controlling actuator 202 are rotated in opposite directions in response to a control signal from the controller 70. Thus, referring to each of FIGS. 11A and 11B, the control shaft 216 rotates the control cam 217 clockwise from the position thereof shown in FIGS.

10A and 10B, thus shifting the center of axle P1 (the thick portion 217a) downward. Consequently, in comparison to each of FIGS. 10A and 10B above, the rocker arm 218 entirely moves downward toward the drive shaft 213 such that the second end portion 218c of the rocker arm 218 pushes the cam-nose end 223 of the rocking cam 220 downward via the link member 226. As a result, the rocking cam 220 is entirely rotated counterclockwise by a predetermined amount.

Figure 11B:
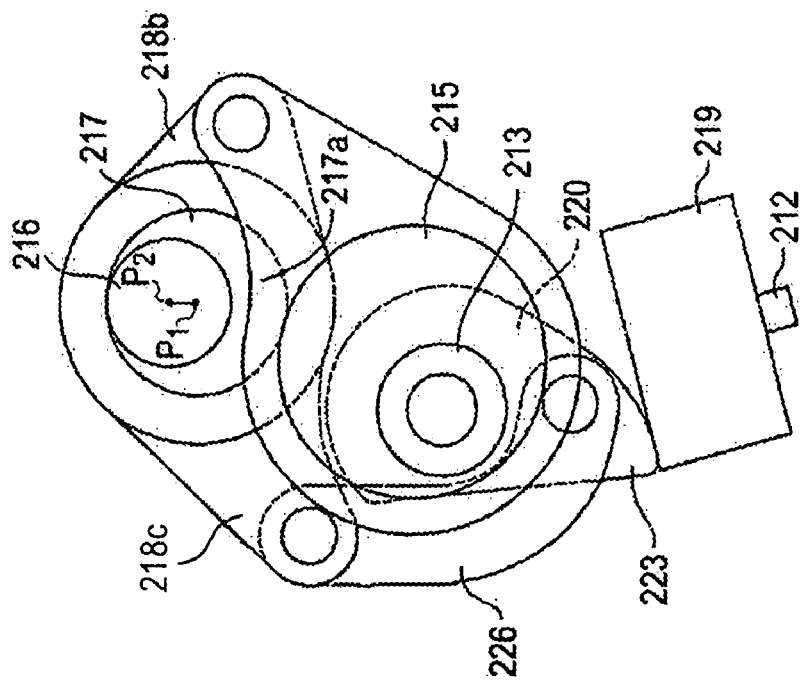
FIGS. 11A and 11B respectively illustrate a minimum rocking state and a maximum rocking state of the valve-timing controlling device when the lift amount for the intake valve is set high.
Figure 11A:
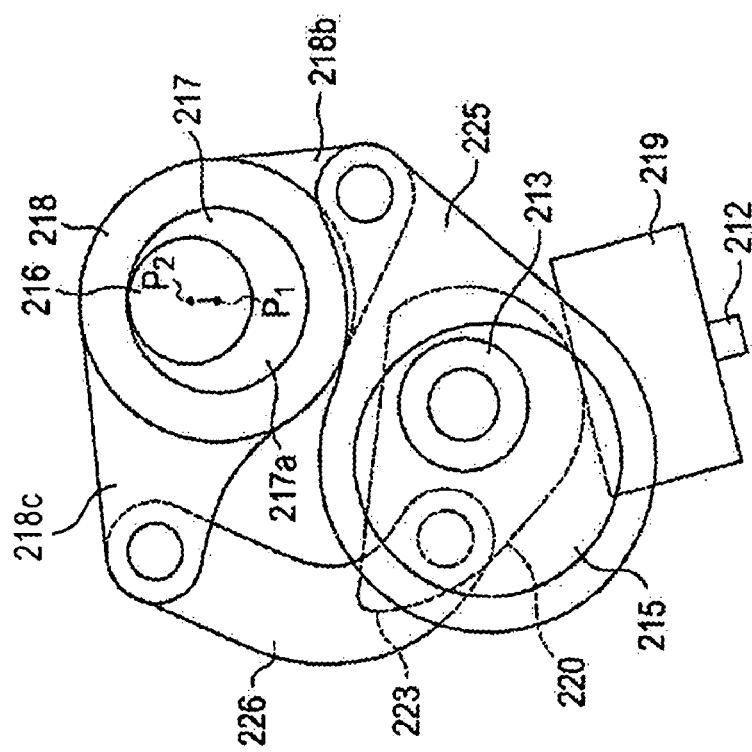

Consequently, when the drive cam 215 rotates to push the first end portion 218b of the rocker arm 218 upward via the link arm 225 as in FIGS. 10A and 10B, the lift amount of the first end portion 218b with respect to the valve lifter 219 is increased as shown in FIG. 11B.

Accordingly, in this case, as the valve lift amount becomes larger, the opening timing of the intake valve 212 is advanced while the closing timing thereof is retarded, as shown in FIG. 12. As a result, an improved intake-air charging efficiency is achieved, whereby sufficient output can be attained.

Figure 13:
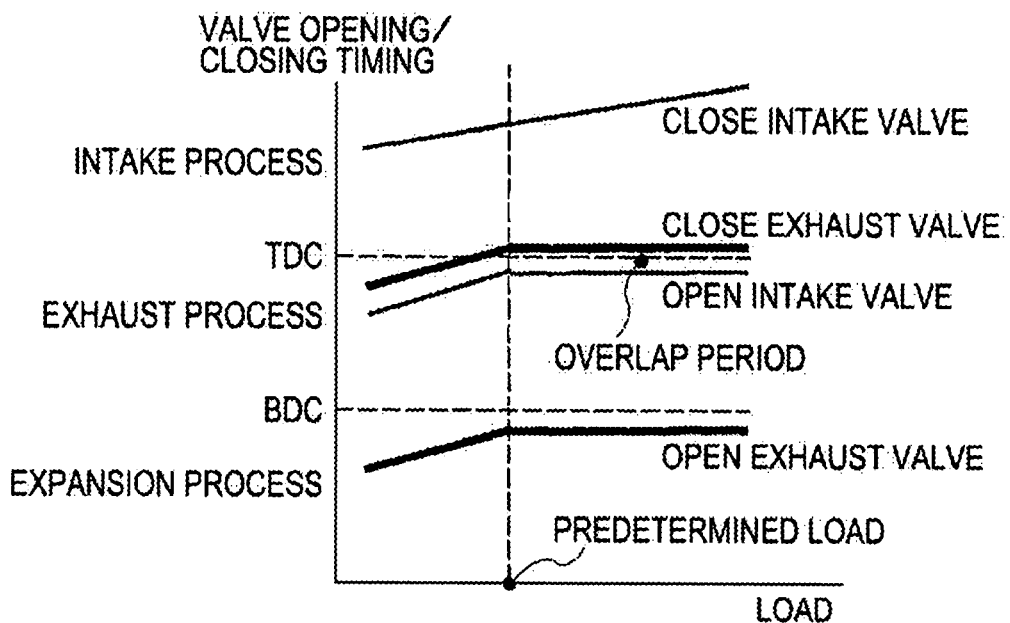
FIG. 13 illustrates opening and closing timings of the intake and exhaust valves for the second exemplary embodiment.

The valve-timing control according to this embodiment will now be described with reference to FIGS. 13 and 14. FIG. 13 illustrates the relationship between the load of the multilink-type variable expansion-ratio engine 10 and the valve timing of the intake and exhaust valves.

In a condition in which a high expansion ratio is maintained such that negative work occurs and the load is equal to or above the predetermined load value that causes high fuel consumption, the opening timing of the exhaust valve 61 is controlled to a specific timing (i.e., before the bottom dead center in the expansion process in FIG. 13) in view of attaining, for example, improved output and fuel consumption. On the other hand, in a case where the load is below the predetermined load value, the exhaust valve 61 is controlled so as to correctively advance the opening timing thereof. In other words, the opening timing of the exhaust valve 61 is adjusted to a timing that is advanced further from the bottom dead center in the expansion process so as to substantially lower the expansion ratio of the engine 10. In this case, the opening timing is advanced more as the engine load decreases. According to this control operation, the expansion ratio becomes lower as the load decreases such as to reduce the occurrence of negative work, thereby achieving improved fuel consumption. With the use of the valve-timing controlling device 100, the closing timing of the exhaust valve 61 is also advanced when the opening timing of the exhaust valve 61 is advanced.

Along with the advance control operation for the exhaust valve 61 when the load is below the predetermined load value, a control operation for advancing the opening timing of the intake valve 212 is also implemented. By performing the advance control operations for the intake valve 212 and the exhaust valve 61, the valve overlap period between the intake and exhaust valves can be maintained, thereby preventing abnormal combustion caused by a change in the amount of internal EGR.

The closing timing of the intake valve 212 is set to an advance-angle side of the bottom dead center of an intake process, and is set such as to be advanced more as the engine load decreases, thus acting as an intake-valve closing-timing adjusting mechanism. This valve-timing control operation for the intake valve 212 regulates the air intake so as to achieve less pumping loss and lower fuel consumption in comparison to an internal combustion engine that controls the air intake using a throttle valve.

Figure 14:
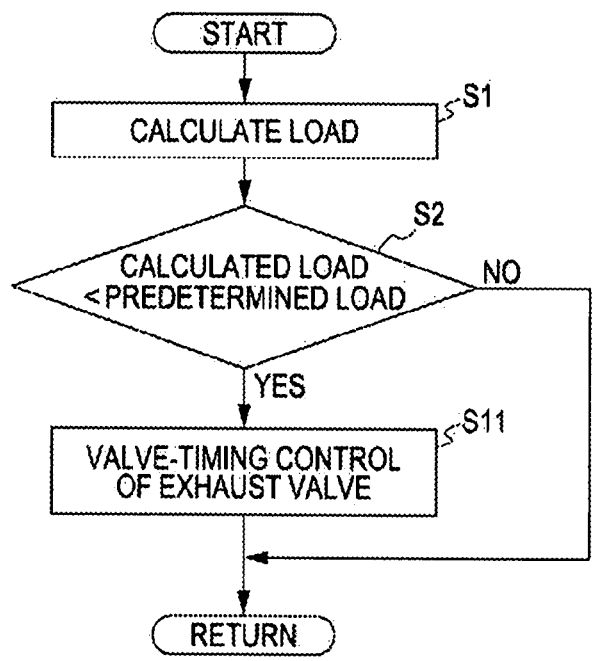
FIG. 14 is a flow chart illustrating a valve-timing control operation for the exhaust valve.

FIG. 14 is a flow chart illustrating the valve-timing control operation for the exhaust valve 61 performed by the controller 70. This control operation is a combination of the valve-timing control for the intake and exhaust valves described above and the variable expansion-ratio control of the multilink-type variable expansion-ratio engine 10 described in the first embodiment. In detail, this control operation corresponds to a case where the response of the valve-timing controlling device 100 for the exhaust valve 61 is substantially the same as the response of a variable expansion-ratio mechanism, which includes the control link 13 that changes the expansion ratio.

In step S1, a load is calculated on the basis of a detection signal of the airflow meter. In step S2, the calculated load is compared with a predetermined load value. If the calculated load is below the predetermined load value, the operation proceeds to step S11. In step S11, since there is a possibility that negative work may occur in the latter half of an expansion process, the opening timing of the exhaust valve 61 is correctively advanced, and the operation ends. On the other hand, if the calculated load in step S2 is equal to or above the predetermined load value, the operation ends.

Consequently, when the response of the valve-timing controlling device 100 for the exhaust valve 61 is substantially the same as the response of the variable expansion-ratio mechanism that changes the expansion ratio, the expansion-ratio control is implemented by prioritizing the valve-timing control for the exhaust valve 61. Alternatively, the expansion-ratio control based on the variable expansion-ratio mechanism may be implemented together with the valve-timing control.

Figure 15:
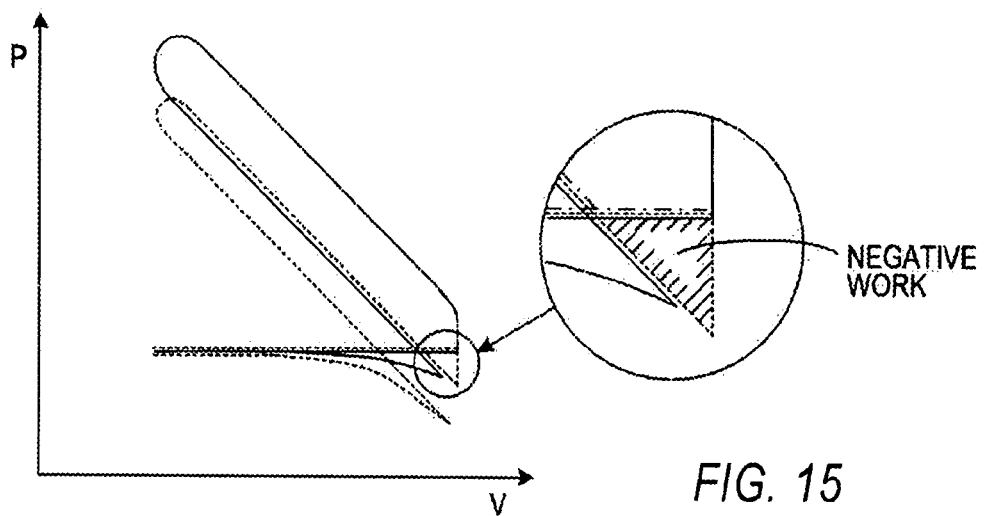
FIG. 15 is a P-V line diagram illustrating an Otto cycle for describing the occurrence of negative work.

FIG. 15 is a P-V line diagram illustrating an Otto cycle in a case where the valve-timing control for the intake and exhaust valves illustrated in FIGS. 13 and 14 is implemented. In FIG. 15, a solid line corresponds to a case where a load is equal to or above a predetermined load value, a dotted line corresponds to a case where the variable expression-ratio control for the intake and exhaust valves according to this embodiment is not implemented when a load is below the predetermined load value, and a dot-dash line corresponds to a case where the variable expansion-ratio control according to this embodiment is implemented when a load is below the predetermined load value.

As shown with the dotted line, when the engine 10 is in operation while the load is below the predetermined load value, the load is controlled by regulating the air intake on the basis of the closing-timing control of the intake valve 212 as described in FIG. 13. Under a condition in which the amount of mixed gas within the cylinder 31a is low and the pressure in the cylinder 31a does not increase by a great degree, the pressure in the cylinder becomes a negative value since the exhaust valve 61 is closed in the latter half of an expansion process. In other words, the engine 10 does negative work. The predetermined load value corresponds to a condition under which a negative pressure is generated in the latter half of an expansion process. When the engine 10 is in operation while the load is equal to or above the predetermined load value, such negative work does not occur, as shown with the solid line. It is considered that a predetermined load range in which negative work occurs is generated only in an engine 10 having a high expansion ratio. This predetermined load range is preliminarily determined from experimental results.

In order to prevent the efficiency from lowering due to negative work, the valve-timing controlling device 100 correctively advances the opening timing of the exhaust valve 61 in this embodiment to substantially lower the expansion ratio so as to reduce the occurrence of negative work.

In FIG. 15, the dot-dash line corresponds to a case where the opening timing of the exhaust valve 61 is correctively advanced. By opening the exhaust valve 61 at a timing at which negative work occurs, the pressure in the cylinder 31a is maintained at the atmospheric pressure, whereby a negative pressure is not generated. Accordingly, this prevents the occurrence of negative work and thus avoids high fuel consumption.

Figure 16A:
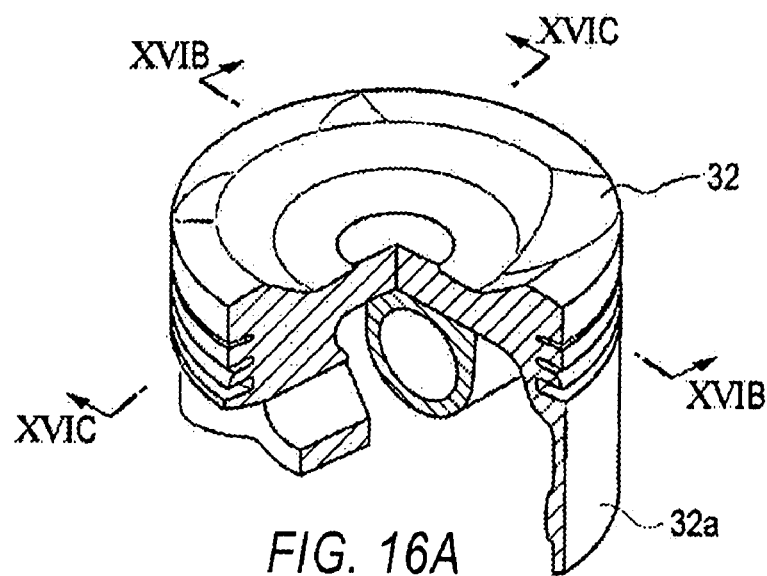
FIGS. 16A to 16C illustrate a piston structure included in a variable expansion-ratio engine according to a third exemplary embodiment.
Figure 16B:
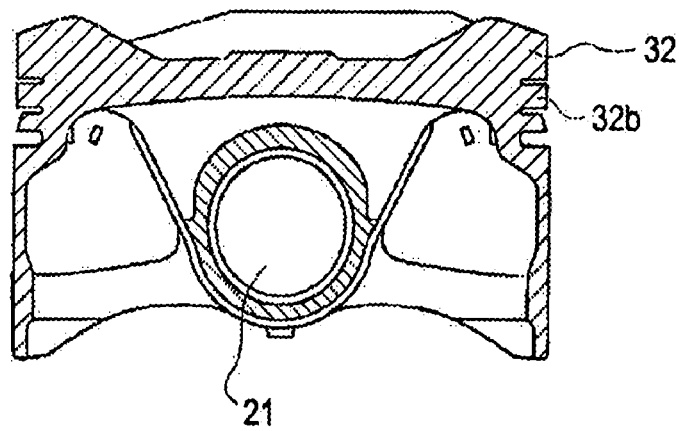
Figure 16C:
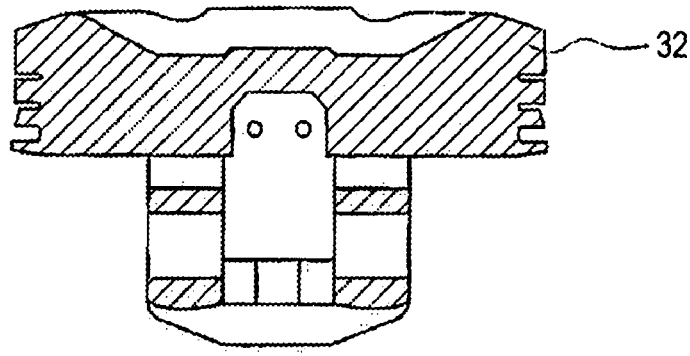

FIGS. 16A to 16C illustrate a piston structure included in a multilink-type variable expansion-ratio engine 10 according to a third exemplary embodiment. Specifically, FIG. 16A is a perspective view of the piston structure, FIG. 16B is a cross-sectional view taken along line XVIB-XVIB in FIG. 16A, and FIG. 16C is a cross-sectional view taken along line XVIC-XVIC in FIG. 16A. FIGS. 17A and 17B illustrate the behavior of the piston 32. In the multilink-type variable expansion-ratio engine 10 according to the third embodiment, as an alternative to the valve-timing controlling device for the exhaust valve 61 illustrated in FIGS. 6 and 7 in which the closing timing changes dependently in response to a change in the opening timing, the valve-timing controlling device 200 shown in FIGS. 8 to 11B is used in which the opening timing and the closing timing can be set independently. This will be described below in detail.

First, referring to FIG. 16C, the piston 32 in this embodiment is characterized in that a piston skirt 32a thereof is partly reduced in width by a significant amount. The piston 32 is constituted by a top portion 32b on which a piston ring is attached, and the piston skirt 32a disposed below the top portion 32b. The piston skirt 32a has its interference portion omitted, which interferes with a pair of counterweights 33c when the crankshaft 33 rotates. The piston 32 is configured such that when it is at the bottom dead center, the piston pin of the piston 32 is positioned between the pair of counterweights 33c (see FIG. 17A). With the use of this piston 32, the piston stroke is made larger than the piston diameter, whereby the expansion ratio (compression ratio) can be increased.

In order to apply the piston 32 that increases the expansion ratio, the lengths of the upper link 11, the lower link 12, and the control link 13 included in the multilink-type variable expansion-ratio engine 10 are modified and optimized from those in the first embodiment. In particular, the upper link 11 is given the minimum length possible to achieve an extended piston stroke.

According to this structure, the engine stroke is extended to achieve a high expansion ratio. In addition, this structure also prevents the shape of the combustion chamber from being flat so as to avoid deterioration of the combustion state. Furthermore, the extended stroke allows for large displacement of the engine 10 without increasing the size of the engine, thereby attaining improved output. On the other hand, if the displacement is the same, the engine size can be reduced so as to achieve weight reduction and improved layout inside the engine room.

Achieving this structure concerns the strength of the piston skirt 32a However, by utilizing the characteristics of the multilink mechanism, as shown in FIG. 17B, the upper link 11 can stand substantially orthogonally at the top dead center position of the piston 32 so that a load acting horizontally on the piston 32 (thrust load) can be reduced. Accordingly, this gives the piston skirt 32a sufficient strength.

Figure 18:
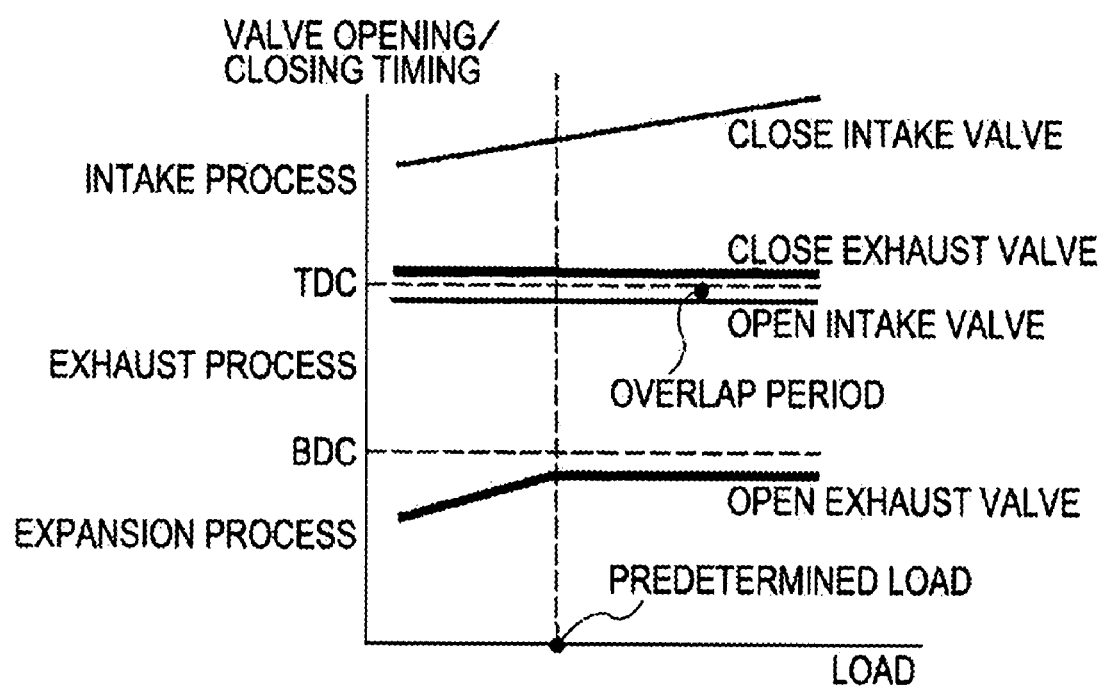
FIG. 18 illustrates opening and closing timings of the intake and exhaust valves for the third embodiment.

The valve-timing controlling device 200 for the intake and exhaust valves according to the third embodiment can control the opening timing and the closing timing in an independent fashion. FIG. 18 illustrates the relationship between the load of the multilink-type variable expansion-ratio engine 10 and the valve timing of the intake and exhaust valves when the valve-timing controlling device according to the third embodiment is used.

In a condition in which a high expansion ratio is maintained such that negative work occurs and the load is equal to or above the predetermined load value that causes high fuel consumption, the closing timing of the exhaust valve 61 is controlled to a specific timing just after the top dead center in the intake process regardless of the engine load. On the other hand, in a case where the load is equal to or above the predetermined load value at which negative work occurs, the opening timing of the exhaust valve 61 is controlled to a specific timing just before the bottom dead center in the expansion process. In contrast, in a case where the load is below the predetermined load value, the opening timing of the exhaust valve 61 is correctively advanced from the bottom dead center. In this case, the opening timing is advanced more as the engine load decreases.

On the other hand, the opening timing of the intake valve 212 is controlled to a specific timing just before the top dead center in the exhaust process regardless of the engine load. Consequently, the closing timing of the exhaust valve 61 and the opening timing of the intake valve 212 are fixedly set regardless of the load, and are set within the same valve overlap period, thereby preventing abnormal combustion caused by a change in the amount of internal EGR.

Figure 19:
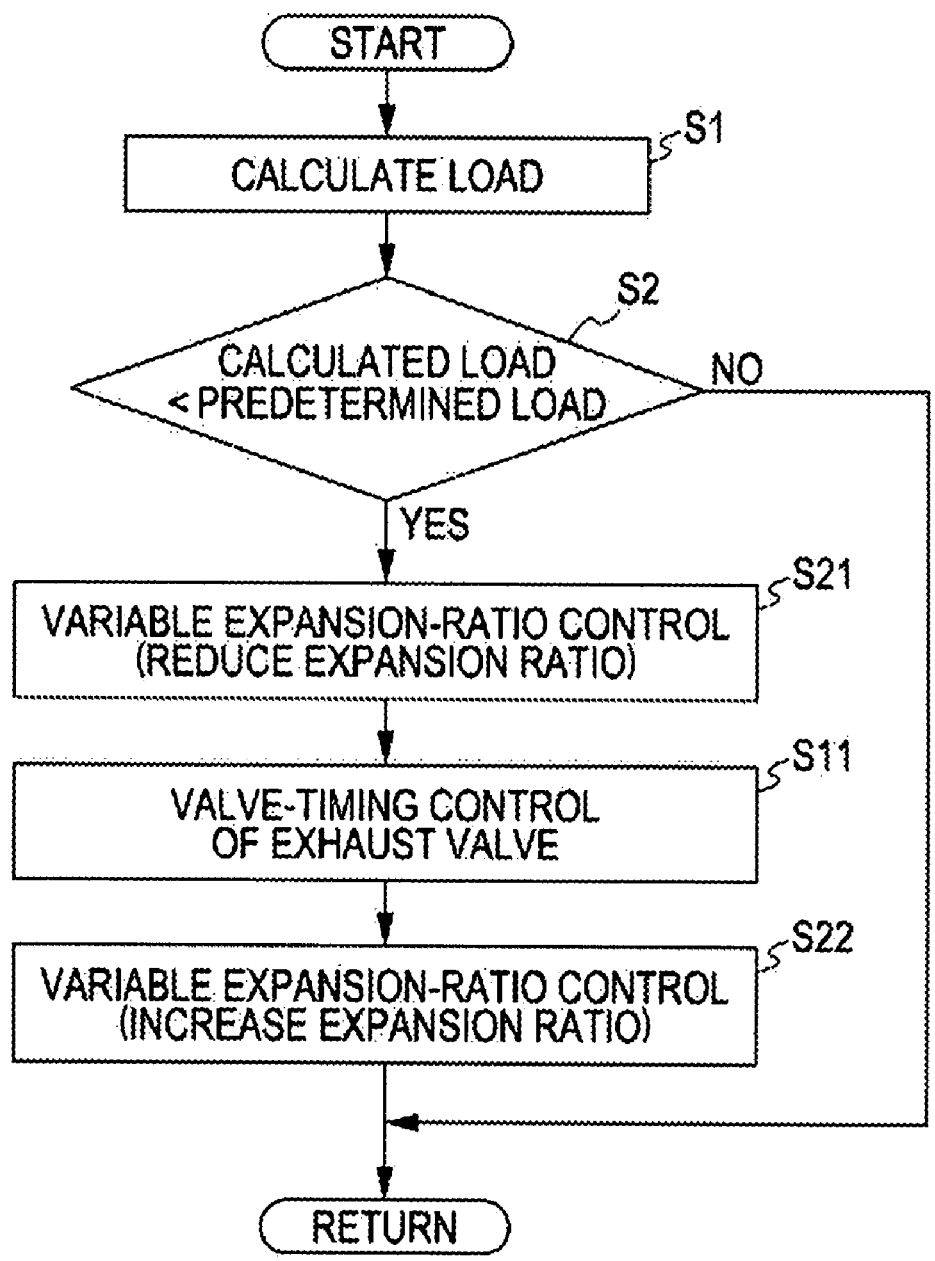
FIG. 19 is a flow chart illustrating a valve-timing control operation for the exhaust valve.

FIG. 19 is a flow chart illustrating the valve-timing control operation for the exhaust valve 61 performed by the controller 70. This control operation may be a combination of the valve-timing control for the intake and exhaust valves described above and the variable expansion-ratio control of the multilink-type variable expansion-ratio engine 10 described in the first embodiment. In that case, the substantial setting range for the expansion ratio of the engine 10 can be further widened. In detail, this control operation corresponds to a case where the response of the valve-timing controlling device 100 for the exhaust valve 61 is slower than the response of the variable expansion-ratio mechanism which includes the control link 13 that changes the expansion ratio. In this case, the response of the variable expansion-ratio mechanism is given a higher priority, such that the expansion-ratio control based on the variable expansion-ratio mechanism is performed first, and the expansion-ratio control based on the valve-timing control of the intake and exhaust values with the slower response is performed afterwards. Prioritizing the control operation having better response can avoid high fuel consumption caused by slow response.

First, in step S1, a load is calculated on the basis of a detection signal of the airflow meter. In step S2, the calculated load is compared with a predetermined load value. If the calculated load is below the predetermined load value, the operation proceeds to step S21. In step S21, the variable expansion-ratio control is performed such as to lower the expansion ratio. Subsequently, in step S11, since there is a possibility that negative work may occur in the latter half of an expansion process, the opening timing of the exhaust valve 61 is correctively advanced. In step S22, the variable expansion-ratio control is performed such as to increase the expansion ratio, and the operation ends. On the other hand, if the calculated load in step S2 is equal to or above the predetermined load value, the operation ends.

Consequently, without impairing the speed of response against the variable expansion ratio, this control operation prevents the occurrence of negative work when the load is below the predetermined load value. Accordingly, improvements in both the speed of response against the variable expansion ratio and the fuel consumption are simultaneously achieved.

The technical scope of the present invention is not limited to the above embodiments, and modifications are permissible within the scope and spirit of the present invention.

The preceding description has been presented only to illustrate and describe exemplary embodiments of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A controlling device for an engine, comprising:
    an expansion-ratio adjuster configured to adjust an expansion ratio;
    a load detector configured to detect an engine load;
    a controller configured to control the expansion-ratio adjuster on the basis of the engine load detected by the load detector in a manner such that the expansion ratio at the time when the load is below a predetermined load value is set lower than that at the time when the load is equal to the predetermined load value; and
    wherein the predetermined load value is a load value at which a pressure in a cylinder falls below the atmospheric pressure before an exhaust valve opens in a latter half of an expansion process.

2. The controlling device for the engine according to claim 1, wherein the controller is further configured to control the expansion-ratio adjuster in a manner such that the expansion ratio at the time when the load is below the predetermined load value becomes lower as the load decreases.

3. The controlling device for the engine according to claim 1, wherein the expansion-ratio adjuster includes an exhaust valve opening-timing adjuster configured to adjust an opening timing of an exhaust valve, and
    wherein when the load is below the predetermined load value, the controller advances the opening timing of the exhaust valve so as to reduce the expansion ratio.

4. The controlling device for the engine according to claim 3, wherein the exhaust valve opening-timing adjuster adjusts only the opening timing of the exhaust valve.

5. The controlling device for the engine according to claim 3, wherein the exhaust valve opening-timing adjuster advances a closing timing of the exhaust valve by the advanced amount of the opening timing of the exhaust valve.

6. The controlling device for the engine according to claim 5, wherein the expansion-ratio adjuster further includes an intake valve opening-timing adjuster configured to adjust an opening timing of an intake valve, and
    wherein when the load is below the predetermined load value, the controller advances the opening timing of the intake valve together with advancing the opening and closing timings of the exhaust valve.

7. The controlling device for the engine according to claim 1, wherein the expansion-ratio adjuster includes a top-dead-center position adjusting mechanism configured to adjust a top-dead-center position of a piston, and
    wherein when the load is below the predetermined load value, the controller lowers the top-dead-center position of the piston so as to reduce the expansion ratio.

8. The controlling device for the engine according to claim 7, wherein the top-dead-center position adjusting mechanism comprises a plurality of links that link the piston to a crankshaft, and
    wherein the expansion ratio is reduced by regulating the movement of at least one of the links.

9. The controlling device for the engine according to claim 8, wherein the plurality of links comprises:
    a first link connected to the piston by means of a piston pin;
    a second link rockably connected to the first link and rotatably connected to the crankshaft; and
    a third link which is rockably connected to the second link and regulates the rocking of the second link.

10. The controlling device for the engine according to claim 7, wherein the piston has stroke characteristics that are substantially a simple harmonic motion.

11. The controlling device for the engine according to claim 7, wherein a stroke amount of the piston is greater than the diameter of the piston.

12. The controlling device for the engine according to claim 3, wherein the expansion-ratio adjuster further includes an intake valve closing-timing adjuster configured to adjust a closing timing of an intake valve, and
    wherein the controller sets a closing timing of the intake valve prior to a bottom dead center point and advances a closing timing of the intake valve as the load decreases.

13. The controlling device for the engine according to claim 1, wherein the expansion-ratio adjuster includes an exhaust-valve opening-timing adjuster configured to adjust an opening timing of an exhaust valve and a top-dead-center position adjusting mechanism configured to adjust a top-dead-center position of a piston, and
    wherein when the load is below the predetermined load value, the controller reduces the expansion ratio by means of the exhaust valve opening-timing adjuster.

14. A method for controlling an engine, comprising the steps of:
    detecting an engine load;
    controlling an expansion ratio of the engine on the basis of the detecting step in a manner setting lower the expansion ratio at the time when the load is below a predetermined load value than that at the time when the load is at least equal to the predetermined load value; and
    placing the predetermined load value at a load value at which a pressure in a cylinder falls below the atmospheric pressure before opening an exhaust valve in a latter half of an expansion process.

* * * * *